(No Model.)

P. K. REEVES.
COVER FOR CANS OR JARS.

No. 402,614. Patented May 7, 1889.

WITNESSES:
Henry A. Janney
Robert M. Loper

INVENTOR
P. Kennedy Reeves

UNITED STATES PATENT OFFICE.

PHINEAS KENNEDY REEVES, OF BRIDGETON, NEW JERSEY.

COVER FOR CANS OR JARS.

SPECIFICATION forming part of Letters Patent No. 402,614, dated May 7, 1889.

Application filed August 8, 1888. Serial No. 282,287. (No model.)

*To all whom it may concern:*

Be it known that I, PHINEAS KENNEDY REEVES, a citizen of the United States, residing at Bridgeton, in the county of Cumberland and State of New Jersey, have invented an Improvement in Jar-Covers, of which the following is a specification.

The object of the said improvement is to add to the efficiency of jar-covers which are made up of two or more pieces, these pieces being usually a lid and a screw-clamp, the lid being fastened to the jar by means of threads or inclines on the clamp bearing under corresponding threads or inclines on the neck of the jar, the invention being particularly applicable to the special class of jars which have bails affixed to their covers. I attain this object by the mechanism illustrated in the accompanying drawings, in which—

Figure 1:
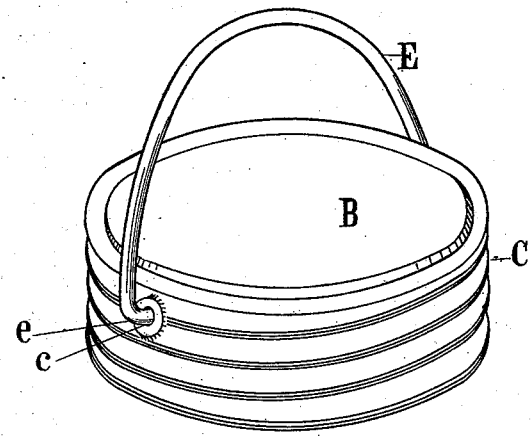
Figure 2:
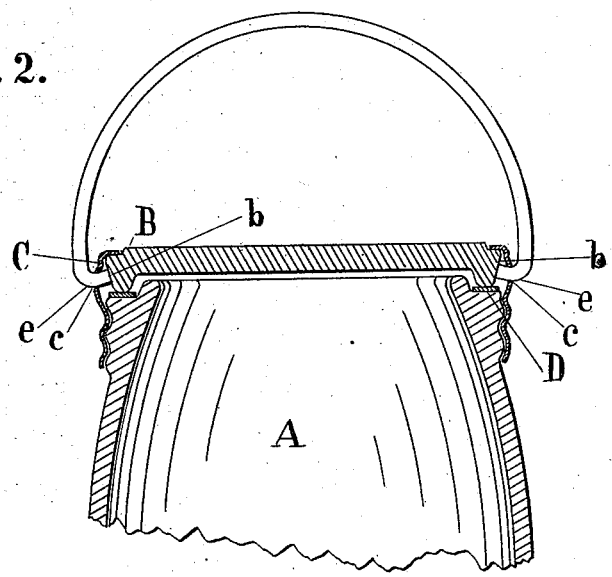

Figure 1 is a perspective view of my improved jar-cover, and Fig. 2 is a sectional view of the same cover clamped or screwed to the neck of a fruit-jar.

The jar A and lid B are usually made of glass. The ring C is made of sheet metal. The gasket D is rubber, and the bail E is a piece of spring-wire cut and formed to shape shown in the illustrations.

The lid B has a conical edge or rim, b b, which rests on gasket D. This lid is clamped firmly to jar A when the threads in screw-ring C are engaged with threads in the neck of the jar and the screw-ring is properly rotated. The ends e e of the bail E pass through holes c c in the screw-ring and bear with some pressure against the conical edge or rim of the lid and force the lid up against the top of the ring, making practically one piece of the cover by preventing the lid from falling out. The bail also serves as a handle for carrying the jar and as a purchase for the hand when screwing the top to the jar.

In order to unite the several pieces which make the complete jar-top, it is only necessary to place the screw-ring over the lid and open the elastic bail until the ends of the bail will enter the holes in the screw-ring, when the bail will spring back to its original position. When opening a hermetically-sealed jar provided with this cover, the lid will naturally stick to the jar, owing to atmospheric pressure, and in unscrewing the screw-ring the ends of the bail will follow the conical surface of the edge of the lid, opening outwardly until the top of the edge is reached, when the bail will spring back to its former shape, the screw-ring being taken off of the top of the jar and the lid removed with a knife, as usual.

The form of screw-clamp is not restricted to a screw-ring, inasmuch as any other perforated clamp capable of being pivotally mounted on the lid and containing lips to engage with the screw-threads of the jar can be used in connection with a suitable spring-bail to produce the above-mentioned effect.

I am aware that jar-covers have been made consisting of the combination of a lid, a clamp, and a bail whose ends hook under a definite projecting shoulder on the edge of the lid, which construction is objectionable, on account of the projecting shoulder on the lid interfering with the bail ends when unscrewing the ring. In such a construction the glass lid will not be kept pressed up into the screw-ring with a constant pressure, and will consequently rattle when shaken. These objectionable features are remedied in the construction herein specified.

What I claim as my invention, and desire to secure by Letters Patent, is—

The combination, with a jar or can having a screw-thread on its neck, of a screw ring or clamp which fits said threaded jar, a lid having an edge which is entirely inclined, on which the screw ring or clamp is pivotally mounted, and a spring-bail whose ends pass inwardly through apertures in the screw ring or clamp and press elastically against the inclined edge of the lid to secure the screw-ring thereto, substantially as set forth.

P. KENNEDY REEVES.

Witnesses:
HECTOR PAYNE,
ROBT. M. LOPER.